Sept. 30, 1969     K. HELD ET AL     3,470,490
PHOSPHOR TRANSDUCER MEANS FOR PUMPING COHERENT LIGHT
GENERATORS BY NUCLEAR ENERGY SOURCES
Filed Nov. 12, 1963     2 Sheets-Sheet 2

INVENTOR.
KALMAN HELD
LEONARD R. SOLON
BY
Edward Halle
ATTORNEY.

United States Patent Office 3,470,490
Patented Sept. 30, 1969

3,470,490
PHOSPHOR TRANSDUCER MEANS FOR PUMPING COHERENT LIGHT GENERATORS BY NUCLEAR ENERGY SOURCES
Kalman Held, Jericho, and Leonard R. Solon, Yonkers, N.Y., assignors to Radioptics, Inc., Carle Place, N.Y., a corporation of New York
Filed Nov. 12, 1963, Ser. No. 323,040
Int. Cl. H01s 3/02
U.S. Cl. 331—94.5      15 Claims

ABSTRACT OF THE DISCLOSURE

This invention relates to a system for producing coherent light, and in particular, a system in which nuclear radiation energy from a nuclear reactor or the like is directed to excite phosphor transducer means such as a scintillating phosphor or the like to induce an electromagnetic radiation output adapted to pump an optical maser means. The invention includes the concept of providing the phosphor transducer means such as a scintillating phosphor or the like to convert the nuclear radiation energy to electromagnetic radiation suitable for pumping an optical maser or masers.

---

This invention relates to coherent light sources or generators such as those designated by the terms "laser" or "optical maser" and the like. The design and operation of coherent light generators is well known and will not be explained here. Information concerning such optical masers will be found in the literature in various places including:

"Applied Optics," Supplement on Optical Masers, 1962, pages 1 ff., "Optical Masers" by O. S. Heavens; and pages 107 ff., "Pumping Power Considerations in an Optical Maser" by O. Svelto;

"Proceedings of the IEEE," vol. 51, No. 1, January 1963, pages 3 ff., "The Laser" by A. Yariv and J. P. Gordon.

Coherent light generators and optical maser materials are also described in U.S. Letters Patent No. 2,929,922, granted on Mar. 22, 1960, on application of Arthur L. Schawlow and Charles H. Townes.

In particular, this invention relates to the employment of a novel transducer for converting ionizing radiation energy, in particular, nuclear radiation energy, to a coherent light output via phosphor transducer means. The source of ionizing energy may be produced by any suitable generator such as a pulsed nuclear reactor, a continuously operating nuclear reactor, pulsed accelerators of charged particles, continuously operating accelerators, and other generators of ionizing radiation, including isotopic radioactive sources. Such generators include sources of charged particles such as beta particles, protons, deuterons, alpha particles as well as uncharged particles or radiation such as gamma rays and neutrons.

It is presently old in the art to provide a coherent light source or generator such as a chromium doped aluminum oxide crystal (artificial ruby) with an excitation source of pumping light such as a flash lamp. The source of energy to power the flash lamp can be obtained from the discharge of a capacitor bank, and this may be charged by a source of electric power or energy. This is well known in the art.

In the present state of the art, the use of a capacitor bank-flash lamp combination may require a permanent power station and a system of capacitor banks. This can impose severe limitations on the size or power output of available coherent light generators. In particular, the size of the pumping energy source for such generators is limited unless it is contemplated to provide a permanent installation rather than a portable installation for a coherent light source. It would obviously be desirable if one could avail oneself of the large energy and power inherent in devices known as nuclear reactors rather than conventional energy sources derived from the conversion of water or coal power to electricity. For example, if it is desired to use a laser system in a situation where there is limited space, such as a satellite, where there is a great premium on size and weight it, would be desirable to have such a system with a compact pumping source such as a nuclear reactor.

Nuclear reactors, as pointed out previously, constitute large sources of energy and power. Pulsed nuclear reactors in particular can furnish very high peak pumping power. In addition to reactors as a source of ionizing radiation, one may also use isotopic sources which may consist of gross fission products, separated fission products and activated nuclides. These isotopic sources can provide amounts of energy which are large compared to conventional chemical batteries and other more usual energy sources.

In addition to the use of reactors and isotopic sources to provide for the production of ionizing radiation, it is possible to employ accelerators. These machines may be powered by conventional electrical energy sources. They have the capability of producing very high instantaneous peak powers.

When using ionizing radiation, such as from nuclear radiation source means, as is contemplated in this invention, it is necessary to provide a transducing means to convert the ionizing radiation to pumping light in the visible, ultraviolet or infrared regions of the electromagnetic spectrum.

It is, therefore, an object of this invention to provide a novel excitation source for effecting coherent light generation where the source of energy is from a nuclear reactor.

It is another object of this invention to provide a novel transducer for converting such ionizing radiation into electromagnetic radiation suitable for optical maser pumping, i.e., for effecting energy state population inversions in the atoms of solid, liquid or gaseous materials in which optical maser transitions can take place.

It is still another object of this invention to provide a coherent light generator system which may be powered by a nuclear reactor and be completely contained in a compact portable installation.

Other objects and advantages of the invention will appear in the specification hereinbelow. The system of the invention is illustrated in the accompanying drawings in which.

Similar numerals refer to similar parts throughout the several views.

Figure 1:
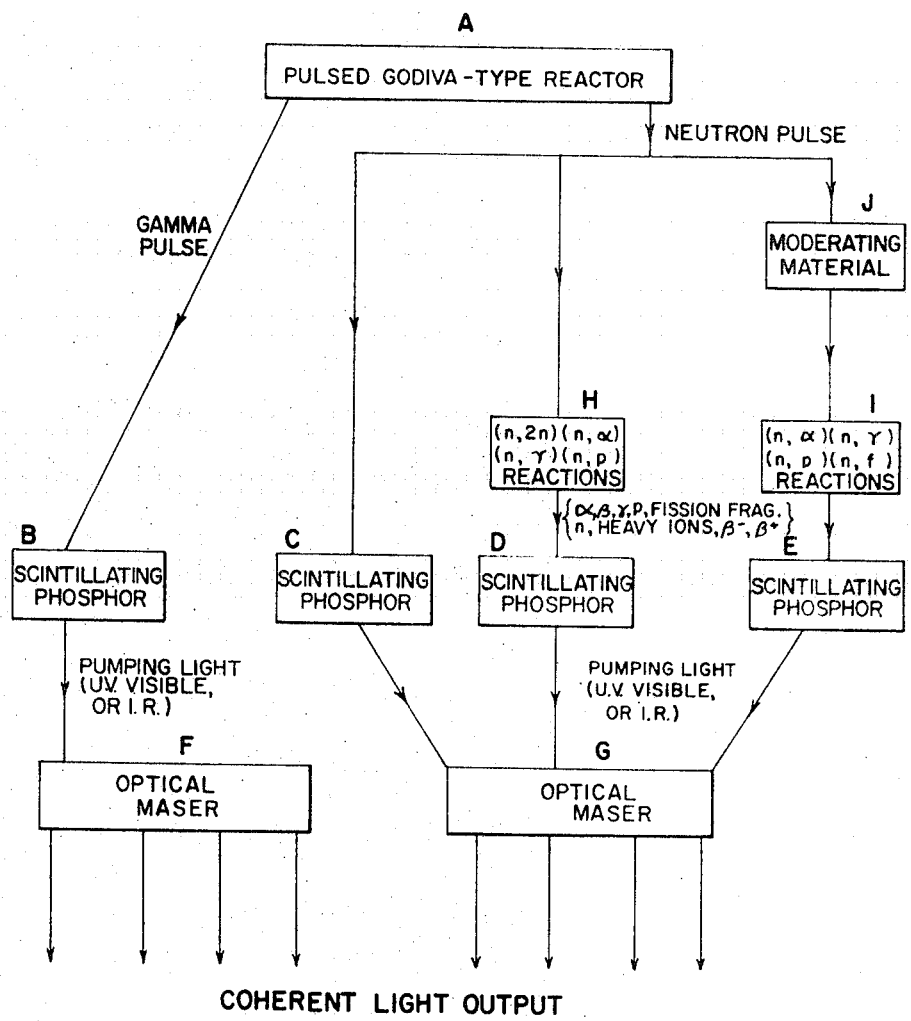
FIG. 1 is a conceptual block diagram showing several ways of converting ionizing radiation from a typical nuclear source to coherent light by phosphor transducer means.

Referring now to FIG. 1 of the drawings, this conceptual block diagram illustrates four ways in which the ionizing radiation may be utilized through the means of a phosphor to pump an optical maser element. In box A containing the legend "Pulsed Godiva-Type Reactor," we represent a typical source of ionizing radiation capable of producing both gamma and neutron pulses. It is to be understood that this is by way of illustration only, and any source of ionizing energy suitable for the system may be employed.

In boxes B, C, D and E, we represent the phosphor element of our invention as will be more fully described hereinbelow.

Boxes F and G represent the optical maser element of the invention from which the coherent light output is emitted.

Boxes H and I represent conversion of the neutron output to charged particles which is more efficient for certain types of phosphor transducers.

Box J represents the use of a moderating material to slow down or thermalize fission neutrons to increase the cross section for the occurrence of certain classes of nuclear reactions.

It is to be understood that in FIG. 1 of the drawings, a first system is illustrated by combining boxes A, B and F to provide for a nuclear pumped laser utilizing the gamma radiation pulse of the source through a phosphor to pump an optical maser arrangement; boxes A through C to G represent another form of the invention in which the neutron radiation pulse is used to pump the optical maser through the phosphor; in the third form of invention illustrated, the system comprises boxes A, H, D and G, in which H represents the conversion of neutron radiation to charged particle radiation, such conversion being more efficient with certain classes of phosphor transducers or scintillating materials than using neutrons directly; and in the fourth form illustrated in sequence A, J, I, E and G, a fission neutron is slowed down or moderated by means of, for example, hydrogenous material (box J) after leaving a reactor, and is captured in materials such as boron or lithium. The resulting nuclear reaction in this fourth form would yield alpha particles and other charged particles which can be efficiently stopped in a thin layer of silver activated zinc sulphide and yields light suitable for the pumping of optical maser materials. Box J could also represent a neutron being moderated and then caused to be captured in a fiber containing uranium 235 as in box I. The resulting nuclear reaction would yield energetic fission fragments of short range which could then be captured in a suitable phosphor such as thallium activated sodium iodide or silver activated zinc sulphide or other suitable phosphor. The resulting yield of electromagnetic radiation in the visible or near visible region of the spectrum is then employed to pump the optical maser element. In addition to reactions (n, α) and (n, f), reference to boxes H and I of FIG. 1 will show that other nuclear reactions may be used as equivalents.

The system briefly is comprised and works as follows:

In the first place, material for a coherent light source or generator known as a laser or optical maser is provided, as indicated at boxes F or G in FIG. 1 of the drawings. Such optical maser or laser materials can be a chromium-ion doped ruby crystal ($Cr^{3+}:Al_2O_3$), or a neodymium-ion doped glass ($Nd^{3+}$:glass) rod, or a uranium-ion doped calcium fluoride crystal ($U^{3+}:CaF_2$), or, in an evacuated tube, a suitable mixture of helium and neon gas, or in an evacuated tube, a pure noble gas such as krypton, or in an evacuated tube, the vapor of an alkali metal such as cesium vapor, or other solid, liquid or gaseous materials in which coherent light generation and amplification can be achieved.

The manner in which coherent light is produced by optical maser action utilizing these materials is well known in the art.

Our invention provides novel excitation or pumping means not known in the prior art, employing phosphor transducer means, or a scintillating phosphor (as indicated at boxes B, C, D or E of FIG. 1 of the drawings) which may either be solid, liquid or gaseous, and which is energized by a device for producing ionizing radiation, such as a nuclear reactor (as indicated at box A). We may refer to our phosphor as either phosphor transducer means or a scintillating phosphor as these terms are equivalent in meaning.

A source of ionizing radiation may be a pulsed nuclear reactor (box A), a continuously operating nuclear reactor, pulsed and continuously operating accelerators of charged particles such as X-ray machines, electrostatic generators and cyclotrons, linear accelerators, proton and electron synchrotrons, neutron sources depending upon the deuteron-tritium reaction, and others.

For purposes of describing this invention, it is to be understood that box A may represent any such source of ionizing radiation. The period of pumping characteristic of each mechanism may vary. Thus, a mechanism that depends on the absorption of thermal neutrons will have a period of time cycle of the order of the neutron thermalization time or greater than 100 microseconds.

In several forms of invention described herein, the ionizing radiation (either gamma radiation or neutron radiation, or both in concert) is not interacted directly with the material of the optical maser element. Rather, to effect light production of optimum wavelength for pumping and to prevent thermal heating of the optical maser material and to minimize radiation damage to the optical maser material, we have provided that the ionizing radiation interact with a scintillating phosphor first, and then have the output of the said phosphor pump the optical maser material.

A wavelength shifter may be incorporated in the scintillating phosphor to effect absorption of the light originally produced and re-emission in a more desirable optical maser pumping band. The use of such wavelength shifters is well known (apart from the invention) in contemporary nuclear detection technology. As an example of wavelength shifting, we cite the use of POPOP=(1,4-di(2-(5-phenyloxazolyl)benzene) as the wavelength shifter with TP-p-terphenyl as the primary scintillator in a polyvinyltoluene carrier. The result of such wavelength shifting yields a phosphor having a wavelength emission band which can be efficiently matched to the absorption band of an optical maser material.

The pumping light source is provided by the novel phohphor transducer of the invention (B, C, D or E). The purpose of the phosphor transducer is to convert the ionizing radiation into electromagnetic radiation including the visible, ultraviolet and infrared portions of the electromagnetic spectrum. It is to be understood that it is not necessary to have pumping light in the visible spectrum in order to properly operate a laser, optical maser or other coherent light system. For example, a pumping light in the ultraviolet region of the electromagnetic spectrum of a different wavelength than the light to be obtained from the coherent light source may, nevertheless, be a perfectly proper and useful pumping light.

The phosphor transducer of the invention may be solid such as the alkali halides, sodium iodide (pure or activated with thallium or other activator), potassium iodide (pure or activated with thallium or other activator), cesium iodide (pure or activated with thallium or other activator), lithium iodide (pure or activated with thallium, tin, europium or other activator), or cesium fluoride (pure or activated). Other solids can serve as a phosphor transducer including zinc sulfide (pure or activated with silver or other activator), calcium tungstate (pure or activated), or the noble gases in frozen, solid form such as xenon, krypton, argon, neon or helium. These frozen gases may be pure or with selected impurities to improve the fluorescent yield or shift the wavelength of the fluorescence to desired pumping bands for optical masers.

The phosphor transducer of this invention may comprise other solid materials which exhibit phosphorescence or fluorescence upon absorbing any form of ionizing energy including X- or gamma rays, neutrons, or elementary charged particles such as protons or alpha particles. In addition to the solid materials already mentioned, one could use as the phosphor transducer large classes of materials known as organic and plastic scintillators. Representative of the organic scintillators are crystals such as anthracene and stilbene, and of the plastic scintillators are such materials as polyvinyltoluene and polystyrene modified in either p-terphenyl, tetraphenylbutadienes, or diphenylstilbenes, or other materials to enhance fluorescence or to shift fluorescent wavelengths.

The phosphor transducer may be a liquid such as toluene as a solvent containing p-terphenyl and/or diphenylhexatrienes and/or 2,5-diphenyloxazole as solvents. Instead of toluene as a solvent, one may use phenylcyclohexane with p-terphenyl or other materials as solvents for enhancing or shifting fluorescence to desired wavelengths for optical pumping. Other liquid scintillators can be employed.

The noble gases (normally gaseous at ordinary temperatures) such as xenon, krypton, argon, neon and helium are at very low temperatures, or at high pressures, in the liquid state, and fluoresce in the optical and near-optical regions of the electromagnetic spectrum after absorbing ionizing radiation.

The phosphor transducer of this invention may be gaseous. In particular, the noble gases xenon, krypton, argon, neon and helium may be used as phosphor transducers to absorb ionizing radiation either in pure form or in combination with certain wavelength shifters to enhance fluoroescence or to shift fluorescent light to more favorable laser pumping wavelengths.

For purposes of definition, we will use the term "phosphor transducer" to cover any material having the properties of absorbing ionizing radiation and emitting electromagnetic radiation in the ultraviolet, infrared or visible portions of the electromagnetic spectrum. It is, of course, understood that the output of the phosphor transducer should have a wavelength which is matched as closely as possible to the absorption, or pumping, band of the optical maser material which is used in the laser. For example, the light output of a sodium iodide phosphor after absorbing ionizing radiation has its maximum output at a wavelength of approximately 4100 Angstroms. The center of the pumping band of chromium doped aluminum oxide is approximately at 4100 Angstroms. Thus, this particular combination of phosphor transducer, namely thallium activated sodium iodide, and optical maser material, namely chromium doped aluminum oxide, comprise a matched set of materials for a coherent light generating system in accordance with this invention.

We have defined the wavelength at which the maximum output from the sodium iodide phosphor transducer may be obtained as well as the center of the pumping band of chromium doped aluminum oxide as being approximately 4100 Angstroms. It is our purpose to use these numbers by way of illustration only to indicate the matching properties of the materials.

Figure 2:
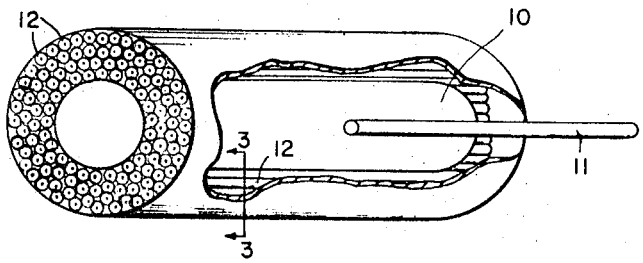
FIG. 2 is a perspective schematic diagram with portions cut away illustrating another form of the invention including a pulsed reactor in the form of a cylinder.

For the mechanism of conversion of ionizing radiation (for example, neutron and gamma radiation) to laser light output, reference is made to FIG. 1 of the drawings. In a first form of the invention represented by the sequence of boxes A, B and F of FIG. 1 of the drawings, and also illustrated in FIGS. 2 and 3 of the drawings, we start with a source of ionizing radiation such as a pulsed nuclear reactor 10 in the form of a cylinder. Such a reactor employs fissionable material such as $U^{235}$ or $Pu^{239}$, and the gamma radiation emitted is employed. There may be a control element 11 for initiating the prompt critical burst. Around the core of the reactor 10, we provide a plurality of rods 12 comprising a cylinder of sodium iodide 13 into which is inserted a central core comprising a ruby rod ($Cr^{3+}:Al_2O_3$) 14.

Thus, we have described a first form of the invention comprising the reactor 10, the scintillating phosphor 13 and the optical maser material 14. Of course, certain well known precautions in the handling of these materials must be taken; for example, the encapsulation of the sodium iodide in a moisture-tight and light-tight container 15. These technical details are well known in contemporary technology, and no further elaboration is needed.

Referring now again to FIG. 1 of the drawings, a second form of the invention is a system comprising boxes A, C and G utilizing the neutron emission of a reactor.

Figure 4:
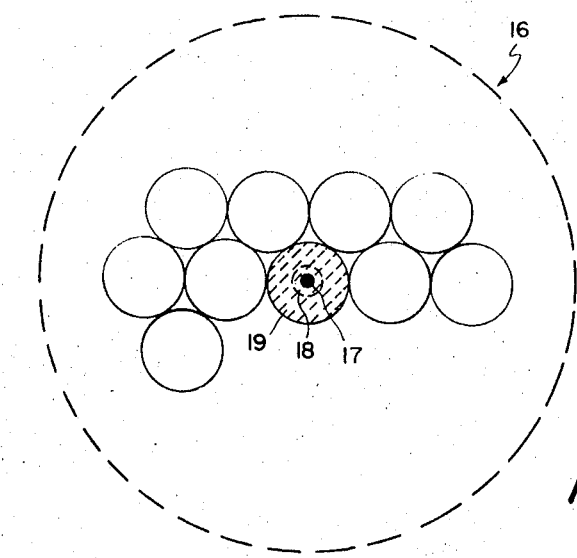
FIG. 4 is a schematic diagram illustrating another form of the invention.

Another form of the invention may be found in FIG. 4 of the drawings which corresponds to the sequence A, H, D and G and associated reactions of FIG. 1 of the drawings. In this form of invention, the neutron pulse radiation emitted from the reactor 10 is employed to interact with a matrix 16 in which is embedded fibers 17, containing $U^{235}$, to produce fission fragments by the (n, f) nuclear reaction. This reaction is indicated in FIG. 1 of the drawings beneath box I. These fission fragments are absorbed by the phosphor 18 which comprises a layer of ZnS(Ag) on the aforementioned $U^{235}$ fiber 17 creating the pumping light to pump the optical maser material 19 which, in this case, is chromium doped aluminum oxide (ruby) ($Cr^{3+}:Al_2O_3$) or other suitable maser material.

Figure 5:
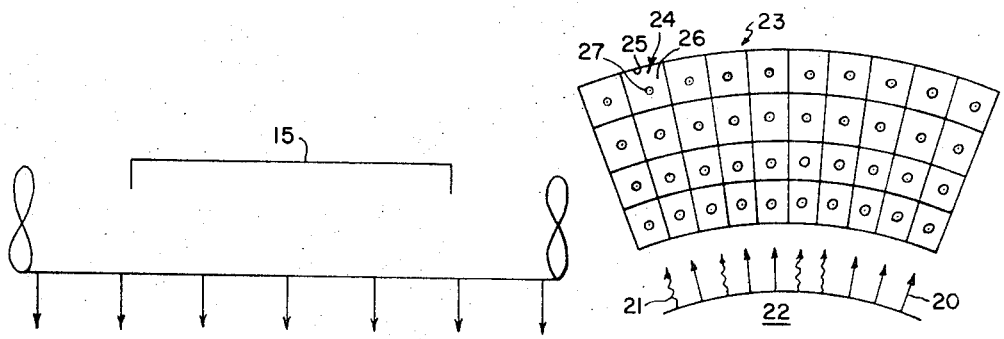
FIG. 5 is another schematic diagram of a cross sectional segment of a reactor core illustrating a third form of the invention.

In another form of the invention as illustrated in FIG. 5 of the drawings, the system utilizes both the neutron and the gamma pulse radiation of the reactor. This technique has the advantage of obtaining ionizing particles of short range (e.g., alpha particles, proton recoils, or fission fragments) by means of (neutron, alpha), (neutron, fission) and (neutron, proton) nuclear reactions. The resulting fluorescence constituting the pumping light may then be obtained in a phosphor transducer of smaller volume.

In this form of invention, the neutron 20 and gamma 21 pulse radiation from reactor core 22 interacts with components of the system which surround the core in stacked array 23 as shown in FIG. 5 of the drawings. For example, each component 24 of the stacked array 23 comprises a perimeter 25 of $U^{235}$ gridded foil surrounding a phosphor mass 26 of sodium iodide which in turn surrounds the optical maser material 27 which may be chromium doped aluminum oxide (ruby) ($Cr^{3+}:Al_2O_3$) or any other suitable laser material.

In the form of invention described as illustrated in FIG. 5 of the drawings, there is a combined system as represented by both sequencies A, B and F; and A, J, I, E, and G of FIG. 1 of the drawings.

It is possible that ionizing radiation can be interacted directly with a phosphor transducer to produce coherent light without a separate optical maser element since the phosphor transducer alone can perform both the function of the transducer and optical maser.

While no specific construction details have been given thus far for the assembly of any of the systems described, it is submitted that in the ordinary practice, a reactor construction such as the Health Physics Research reactor at Oak Ridge National Laboratory is set up. This construction is described in M. I. Lundin's "ORNL Fast Burst Reactor and Facilities" Report No. ORNL–CF–60–8–116 (Oak Ridge National Laboratory, Oak Ridge, Tenn., 1960).

Figure 3:
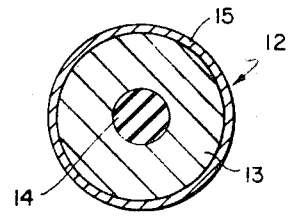
FIG. 3 is a cross section of one rod as indicated by the lines 3—3 in FIG. 2.

An optical maser material 14 surrounded by a phosphor 13 is prepared such as a ¼" diameter ruby rod 4" long coaxial with a 4" diameter right cylinder of sodium iodide contained in a moistureproof aluminum can 15 is mounted on any suitable frame or mounting means in juxtaposition to the aforementioned reactor substantially at the center plane of the reactor. The sodium iodide, which acts as the phosphor transducer 13, has an electromagnetic radiation output which matches the pumping band of the ruby rod, the optical maser material 14. While it may be difficult to make an exact match between the electromagnetic radiation output of the phosphor transducer and the exact absorption (pumping) wavelength band of the maser material, this is not critical as long as the electromagnetic radiation output is within the optimum pumping wavelength band of the maser material. The system will work in any event so long as there is a substantial overlap by the emission spectrum of the phosphor transducer and the absorption wavelength band of the optical maser material. The use of sodium iodide as described hereinabove as a phosphor transducer and the ruby material as the optical maser material will be sufficiently matched for the purposes described. It is also esential that the phosphor transducer output be optically coupled in an efficient manner to the optical maser material. This may be done in a number of different ways for purposes of this invention. Usually the phosphor transducer will be geometrically juxtaposed to the optical maser material as illustrated in FIG. 3 of the drawings. The optical coupling efficiency may be increased by matching the indices of refraction of the phosphor transducer 13 and optical maser materials 14, or by inserting a transparent fluid (not shown) of appropriate index of refraction to minimize light losses at the phosphor transducer optical maser material interface. Other mechanisms for improving optical coupling may involve the employment of mirrors and lenses (not shown) well known in the optical engineering art.

In another form of our invention, we may utilize modified neutron energy from a nuclear reactor by setting up a tower containing moderating material such as hydrogen compounds including polyethylene, paraffin or zirconium hydride. There are other moderating materials such as deuterium, graphite or beryllium. Any other moderating material which may be known in the art will be suitable for moderation of the reactor neutrons.

In a system comprising the use of reactor neutrons, we may incorporate europium doped lithium iodide as a phosphor transducer in combination with chromium doped aluminum oxide as the optical maser material.

Moderated neutrons of thermal or near thermal energies from particle accelerators may also be employed as the source of ionizing radiation in other forms of our invention in which we would also employ the europium doped lithium iodide as the phosphor transducer and chromium doped aluminum oxide as the optical maser material. The following nuclear reactions would be typical of those which could be used in the particle accelerators in the systems described hereinabove:

$$_1H^2 + {_1H^3} \rightarrow {_0n^1} + {_2He^4}$$

$$_1H^2 + {_1H^2} \rightarrow {_0n^1} + {_2He^3}$$

Of course, any other type of constructions such as those shown, described and illustrated in the various figures of the drawings, as well as others, may be employed.

While we have described our invention in its preferred forms, there are other forms which it may take without departing from the spirit and scope of the invention. For example, we have described hereinabove the use of fissionable material such as $U^{235}$ in fiber form. Other methods for the distribution of fissionable material exist. We may disperse the $U^{235}$ on the surface of a thin film. In addition, the fissionable material may be dissolved in the body of the phosphor. For example, in the case of a solid, this would involve dispersal of the fissionable material as part of the crystal matrix. The liquid state would involve dissolving the appropriate fissionable material in molecular form. For the gaseous state, it might involve a homogeneous mixture of a fissionable material in appropriate form such as $UF_6$ in a suitable rare gas such as xenon, krypton, neon, helium or a mixture of the appropriate rare gases.

In addition, other forms of the invention may be devised, and we, therefore, desire to be protexted for all forms coming within the claims appended hereinbelow.

Wherefore we claim:
1. Apparatus for producing coherent light, comprising a nuclear radiation source, a phosphor transducer material, and an optical maser material, said nuclear radiation source being positioned so that its radiation excites said phosphor transducer material, said phosphor transducer material being adapted to convert incident nuclear radiation to electromagnetic radiation, said optical maser material having a pumping wavelength band, the electromagnetic radiation wavelength band of said phosphor transducer material coinciding at least in part with said pumping wavelength band of said optical maser material, the electromagnetic radiation from said phosphor transducer material being coupled to said optical maser material for pumping said optical maser material to produce a coherent optical output.

2. Apparatus as defined in claim 1 in which the nuclear radiation source is a nuclear reactor.

3. Apparatus as defined in claim 1 in which the nuclear radiation source is an isotopic source comprising at least one radio-nuclide.

4. Apparatus as defined in claim 1 in which the phosphor transducer material comprises thallium activated sodium iodide and the optical maser material is composed of chromium doped aluminum oxide.

5. Apparatus as defined in claim 1 in which the nuclear radiation source comprises a nuclear reactor and a neutron moderating material adapted to modify the energy of the neutrons emitted by the said reactor, and wherein the phosphor transducer material comprises europium doped lithium iodide and said optical maser material comprises chromium doped aluminum oxide.

6. Apparatus as defined in claim 1 in which the phosphor transducer material comprises an alkali halide.

7. Apparatus as defined in claim 1 in which the phosphor transducer material comprises an alkali halide in conjunction with an activator.

8. Apparatus as described in claim 1 in which the phosphor transducer material comprises a noble gas.

9. Apparatus for producing coherent light as defined in claim 1, including wavelength shifting means for shifting the wavelength of said electromagnetic radiation to effect a substantial overlap of the electromagnetic radiation output wavelength band of said phosphor transducer material with the wavelength pumping band of said optical maser material.

10. Apparatus as described in claim 9 in which the phosphor transducer material comprises a noble gas.

11. Apparatus for producing coherent light, comprising:
a source of nuclear radiation, and
a plurality of individual cells, each of said cells containing
a phosphor transducer material, and
an optical maser material, said phosphor transducer means being adapted to convert incident nuclear radiation from said source to electromagnetic radiation, said optical maser material having a pumping wavelength band which coincides at least in part with the wavelength band of said electromagnetic radiation, said electromagnetic radiation being coupled to said optical maser material for pumping optical maser material to produce a coherent optical output.

12. Apparatus for producing coherent light as defined in claim 11, wherein in each of said cells one of said materials substantially envelopes the other of said materials.

13. Apparatus for producing coherent light as defined in claim 12, wherein each of said cells includes a portion of said nuclear radiation source.

14. Apparatus for producing coherent light as defined in claim 12, wherein a plurality of said cells are concentrically arrayed around a single nuclear radiation source.

15. Apparatus for producing coherent light as defined in claim 12, wherein, as to each of said cells, said phosphor transducer material substantially envelopes said optical maser material, and further comprising a container having opaque side walls surrounding said phosphor transducer material.

References Cited

UNITED STATES PATENTS

| | | | |
|---|---|---|---|
| 2,314,096 | 3/1943 | Leverenz | 331—94.5 X |
| 2,719,127 | 9/1955 | Schenck | 252—301.4 |
| 2,884,529 | 4/1959 | Eggler et al. | 250—71.5 |
| 3,178,657 | 4/1965 | Morse | 331—94.5 |
| 3,202,934 | 8/1965 | Coffee | 331—94.5 |
| 3,303,342 | 2/1967 | O'Dell et al. | 252—301.4 X |

FOREIGN PATENTS

| | | |
|---|---|---|
| 1,323,829 | 3/1963 | France. |

OTHER REFERENCES

Electronics: "Laser Space Weapon in R & D," vol. 34, Dec. 22, 1961, page 17.

Electronics Newsletter: "Gamma-Ray Exposure Retards Lasing Action," Electronics, vol. 36, No. 52.

Kessler et al.: "Modulation of Recombination Radiation," IBM Tech., Disc., Bull., vol. 6, No. 1, June 1963, page 122.

DAVID H. RUBIN, Primary Examiner

E. BAUER, Assistant Examiner

U.S. Cl. X.R.

250—71.5, 83.1; 252—301.4